Patented July 28, 1953

2,647,104

UNITED STATES PATENT OFFICE 2,647,104

LINEAR POLYESTER COMPOSITION

Joseph C. Shivers, Jr., West Chester, Pa., assignor to E. I. du Pont de Nemours and Company, Wilmington, Del., a corporation of Delaware No Drawing. Application July 30, 1951, Serial No. 239,398

15 Claims. (Cl. 260—75)

This invention relates to a process for preparing new and improved polymeric compositions which are readily dyeable and to the resulting products, comprising linear polymers of terephthalic acid and a polymethylene glycol. More particularly, the invention relates to modifications of polymeric ethylene terephthalate to provide readily dyeable material for yarns, fibers, fabrics, films, etc.

In the recently issued patent of Whinfield and Dickson, U. S. 2,465,319, there is described an important new series of highly polymeric polyesters prepared by the condensation of terephthalic acid and a polymethylene glycol containing from 2 to 10 carbon atoms. These polymers are relatively insoluble, chemically inactive, hydrophobic materials capable of being formed into filaments which can be cold-drawn to produce textile fibers of superior strength and pliability. However, principally because these materials are not readily permeable to water, they cannot be satisfactorily dyed by the ordinary dyeing procedures used in dyeing cotton, wool, natural silk, and regenerated cellulose.

It has been found that a slight amount of coloration to secure light shades may be obtained by dyeing polyethylene terephthalate at atmospheric pressure and 100° C. This occurs, however, only with one group of dyestuffs, i. e., the water-insoluble anthraquinone and azo dyes known to the trade as dispersed acetate dyes. The utility of a fiber-forming polymer in the textile field is extremely limited unless it can be readily dyed on commercial dyeing equipment.

A simple and sometimes effective method of building dyeability with acid dyestuffs into a non-dyeable fiber is that of incorporating basic nitrogen in the polymer. In the case of polyethylene terephthalate, attemps to copolymerize ethylene glycol and a terephathalic acid derivative with a glycol or dibasic acid containing an amine group did not produce satisfactory fiber-forming materials. Glycols and dibasic acids substituted with primary and secondary amino groups generally lead to cross-linked polymers not suitable for use in making fibers, films and the like. Attempts to form copolymers with glycols and dibasic acids containing a tertiary amine group by ordinary methods have resulted in low molecular weight polymers, not suitable for fiber formation, which were dark in color.

It is an object of this invention to chemically modify polyethylene terephthalate so that it can be readily dyed with acid or direct dyes which normally will not dye the unmodified polymer. It is a further object to provide a process for introducing basic nitrogen-containing materials into the polyester structure, in particular aminoalcohols which are unstable at high temperatures and cannot be introduced by means of normal condensation polymerization techniques to give useful fiber-forming copolymers. Other objects will become apparent from the following description and the appended claims.

In accordance with the present invention it has been found that chemically modified polyethylene terephthalate, containing sufficient basic nitrogen so that it can be dyed readily with acid and direct colors, can be prepared by reacting polyethylene terephthalate with certain aminoalcohols at reaction temperatures in the range of 100° to 150° C., or at higher temperatures up to 275° C. by limiting the reaction time with the aminoalcohol. The useful range of per cent nitrogen in the modified polymers for dyeing with a carrier is from 0.15% to 0.4% nitrogen. The modified polymers can be dyed without a carrier if the nitrogen range is above 0.40%.

The resulting nitrogen-containing copolymers are sufficiently stable to be polymerized to higher molecular weights by ordinary polymerization techniques, or to be melt-blended with high molecular weight polyethylene terephthalate. Discoloration and degradation can be limited sufficiently in this way to introduce the aminoalcohols into ethylene terephthalate polymers in solution or powder or molten form or in the form of yarns, fibers, filaments, ribbons, films and other shaped articles.

Aminoalcohols suitable for use as modifying agents in accordance with this invention are represented by the following formula:

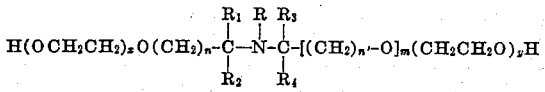

wherein R is sterically hindered hydrogen and alkyl, aralkyl and alicyclic radicals of 1 to 18 carbon atoms; $R_1$, $R_2$, $R_3$ and $R_4$ are hydrogen and hydrocarbon radicals of 1 to 6 carbon atoms; $n$ and $n'$ are integers at least equal to 1; $m$ is 0 and 1; and $x$ and $y$ are integers at least equal to 0. According to this formula, tertiary aminoalcohols are contemplated when $m$ and $y=0$, $x=0$ or a positive integer, and $n=$at least 1. Tertiary aminoglycols are included when $m=1$, $n$ and $n'=$at least 1, and $x$ and $y=0$ or a positive integer. The secondary aminoglycols (sterically hindered) have the same qualifications as the tertiary aminoglycols except that R=hydrogen and $R_1$ and $R_3$ are hydrocarbon radicals of 1 to 6 carbon atoms.

Of these aminoalcohols the dihydric alcohols are preferred, because the two reactive hydroxyl groups are capable of reacting with the ends of two polymer chains to form longer chains. Illustrative of dihydric aminoalcohols of this class suitable for use in this invention are N-methyl diethanolamine, N-ethyl diethanolamine, N-butyl diethanolamine, N-benzyl diethanolamine, N-(alphamethylbenzyl) diethanolamine, N-cyclohexylmethyl diethanolamine, methyl di-($\beta$-hydroxyisopropyl) amine, and methyl di-(4-hydroxybutyl) amine.

Aminoglycols which are secondary amines are also suitable for use when the N-hydrogen is sterically hindered (i. e., in the above formula $R$ is hydrogen and $R_1$ and $R_3$ are hydrocarbon radicals). Examples of this class are di($\beta$-hydroxyisopropyl) amine and di(hydroxy-tertiarybutyl) amine.

Monohydric amino alcohols represented by the above formula are end-groupers and tend to limit the molecular weight which can be obtained in modified polymers. Nevertheless these compounds are useful, especially for treating shaped structures, such as fibers, and for preparing modified polymers to be melt-blended with high molecular weight polymers. Illustrative of monohydric aminoalcohols suitable for use are N, N-dimethyl ethanolamine, dimethyl (4-hydroxybutyl) amine, N-methyl-N-butyl ethanolamine, N,N-dibenzyl ethanolamine, N-methyl-N-cyclohexylmethyl ethanolamine, 2-dimethylaminopropanol, N-hydroxyethyl piperidine, and N-hydroxyethyl morpholine.

It is particularly surprising that ethylene terephthalate polymers can be converted to readily dyeable copolymers by the process of this invention without adverse color formation and excessive decomposition. When the N-alkyl substituted diethanolamine modifiers $$[R-N=(CH_2CH_2OH)_2$$

where R is, for example: 

$CH_3$, $C_2H_5$, $C_4H_9$, $C_6H_5CH_2$, 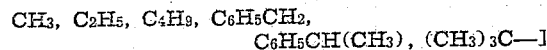
$C_6H_5CH(CH_3)$, $(CH_3)_3C-]$ of this invention are copolymerized with a linear dihydric alcohol and terephthalic acid or its dimethyl ester under melt polymerization conditions, e. g., at 260°, only low molecular weight polymers unsuited for fiber formation are formed and, in most cases, the product is very dark in color. The N-aryl substituted diethanolamines $[R-N=(CH_2CH_2OH)_2$, where R is $C_6H_5$ or $C_{10}H_7]$ are such weak bases that the polyesters modified with them in accordance with this invention fail to dye with acid colors at a pH of 2 even using a carrier in the dyebath.

The process of this invention is an ester interchange reaction whereby the linear polyester chain is broken by a primary alcohol unit containing the amino nitrogen modifier. The molecular weight of the treated polymers is usually lowered to some extent by the process and, if higher molecular weights are desired, the polymers treated with aminoglycols may be repolymerized by various techniques. That the modifier chemically combines with the polymer chain can be shown by nitrogen analyses after exhaustively extracting the treated polymer with a solvent for the aminoalcohol. The products of this invention are therefore, modified polymers, the linear chains of which comprise terephthalic acid radicals, ethylene glycol radicals, and aminoalcohol radicals.

The modification of ethylene terephthalate polymers with the basic modifiers described in this invention can be carried out in a number of ways. A solution of the ethylene terephthalate polymer can be treated with the aminoalcohol or the solid polymer can be reacted heterogeneously with the aminoalcohol. Both processes are equally successful in modifying the polymer. Surprisingly, this process may be applied to shaped structures of ethylene terephthalate polymers such as fibers, films, fabrics and the like, with an attendant lowering of the molecular weight of the polymer without an apparent physical change of the shaped structures.

This invention can best be understood by reference to the following examples, which are illustrative and not to be construed as limitative, and in which parts and portions are by weight unless otherwise specified:

*Example I*

One part of chip polyethylene terephthalate, prepared as described in Whinfield and Dickson, U. S. 2,465,319, was dissolved in 10 parts of diphenyl ether containing 0.6 part of methyldiethanolamine at 250° C. and heated for 2½ minutes. The resulting composition was cooled, washed with petroleum ether and filtered. After drying, the powdered polymer, now containing 0.42% nitrogen by analysis, was placed in aqueous dyebaths containing Pontacyl Rubine R (C. I. 179), an acid color, and Pontamine Fast Red 8BL (C. I. 273), a direct color, respectively, and heated to 98° C. for one hour. After subsequently scouring for one hour in ½% soap solution, the polymer samples were found to be colored to deep washfast shades.

When dyed under the same conditions, the untreated powdered polyethylene terephthalate obtained from a similar diphenyl ether solution which did not contain methyldiethanolamine, failed to take up the dyestuff. The 0.42% nitrogen content of the polymer product means that the linear polymer chains now contain 3.5% by weight of chemically combined N-methyl diethanolamine radicals.

Other solvents can be used in this procedure to effect solution of the polyethylene terephthalate at lower temperatures, for instance, alpha-chloronaphthalene at 200° C. or a mixture of phenol and trichlorophenol (10:7 by weight) at approximately 120° C. The nitrogen content of the polymer was found by experiment to be dependent on both the temperature and length of time allowed for the reaction between the polyethylene terephthalate and the aminoalcohol.

*Example II*

Polyethylene terephthalate of high intrinsic viscosity was treated with excess methyldiethanolamine (enough to cover the polymer) in an autoclave at 145° C. for 30 minutes. After washing with acetone and drying, the resulting polymer was found to contain 0.23% nitrogen by analysis, corresponding to a 1.92% by weight methyldiethanolamine content. This polymer was melt-spun into fibers having a tenacity of 2.0 grams per denier. These fibers dyed to deep shades with Pontacyl Rubine R (C. I. 179) and Pontamine Fast Red 8BL (C. I. 278) in boiling aqueous dyebaths containing 2% by weight metacresol, which acts as a dye assistant when polyethylene terephthalate yarn is dyed under similar conditions with dispersed acetate dyestuffs. This dye assistant, however, has no effect on the dyeing of untreated polyethylene terephthalate yarn with acid and direct colors.

*Example III*

A copolyester obtained by polymerizing ethylene glycol with 90% terephthalic acid and 10% sebacic acid was treated with excess methyldiethanolamine in an autoclave at 145° C. for 20 minutes. The treated polymer was washed with acetone and dried and finally repolymerized in the powder form at 218° C. in vacuo with a nitrogen bleed for 18 hours. The resulting polymer, now containing 0.53% nitrogen (4.43% methyldiethanolamine), was melt spun into fibers which dyed to deep shades with Anthraquinone Blue SWF (Prototype of C. I. 12) and Pontamine Fast Red 8BL (C. I. 278), without the aid of a dye assistant such as metacresol. The untreated copolymer yarns will not take up acid and direct dyestuffs even in the presence of a dye assistant.

*Example IV*

One part of yarn prepared by melt-spinning polyethylene terephthalate was treated with 250 parts of a 2% solution of methyldiethanolamine in xylene at 140° C. for one hour. The yarn was washed with acetone and dried. Yarn treated in this manner dyed readily to deep shades with both acid and direct colors applied in the manner described in Example II using 2% metacresol as a dyeing assistant.

Higher concentrations of methyldiethanolamine in xylene (for example, 10%) were found to be detrimental to the yarn structure, since serious degradation occurred and the yarn failed to maintain its physical shape during subsequent dyeing procedures.

*Example V*

Yarns from copolymers of polyethylene terephthalate in which 5% and 10% of the acid component was sebacic acid were treated with 1% and ½% solutions of methyldiethanolamine in xylene, respectively, for one hour at reflux temperatures. The yarns so treated were washed with acetone, dried and dye with Pontacyl Rubine R (C. I. 179) and Pontamine Fast Red 8BL (C. I. 278) to give deep shades using 2% metacresol as a dyeing assistant.

*Example VI*

Polyethylene terephthalate yarn was dipped in methyldiethanolamine at room temperature and the wet yarn placed in an autoclave at 140° C. for 10 minutes. After washing the treated yarn with acetone, the yarn was dried and found to be readily dyeable with Pontacyl Rubine R (C. I. 179) and Pontamine Fast Red 8BL (C. I. 278) using 2% metacresol as a dyeing assistant.

When using this technique, the heating period should be limited to ten minutes. Yarn treated for a period of thirty minutes with the aminoalcohol was degraded to such an extent that broken filaments were noted throughout the yarn structure, although the yarn dyed to exhaust with 5% acid and direct colors.

*Example VII*

Chip polyethylene terephthalate was treated with methyldiethanolamine in diphenyl ether for 5 minutes as described in Example I. The isolated polymer was polymerized further in powder form by heating the powder to a temperature of 245° C. for 4.5 hours at sub-atmospheric pressure in the presence of a constant flow of nitrogen. The resulting polymer had an intrinsic viscosity of 0.28 and contained 0.35% by weight of nitrogen, corresponding to 2.92% methyldiethanolamine. Yarn prepared by melt-spinning this treated polymer dyed readily with Anthraquinone Blue SWF (Prototype of C. I. 12) and Pontamine Fast Red 8BL (C. I. 278) from boiling aqueous dyebaths containing 2% by weight metacresol as a dye assistant.

*Example VIII*

An ethylene terephthalate copolymer prepared from ethylene glycol and 90% terephthalic acid and 10% sebacic acid was treated with methyldiethanolamine in diphenyl ether for 5 minutes as described in Example I. The resulting copolymer was powder polymerized at 218° C. for 6 hours to give a copolyester with an intrinsic viscosity of 0.46 and containing 0.15% nitrogen by weight. Yarn prepared by melt-spinning this copolymer dyed readily to deep shades with Anthraquinone Blue SWF (Prototype of C. I. 12) and Pontamine Fast Red 8BL (C. I. 278) applied from boiling aqueous dyebaths containing 2% metacresol as a dye assistant.

*Example IX*

A low molecular weight copolyester prepared from ethylene glycol and 40% terephthalic acid and 60% sebacic acid was treated with excess methyldiethanolamine. The ethylene glycol displacement was effected at 135° C. for two hours at 2 mm. pressure. Excess methyldiethanolamine was removed and the treated copolymer was finally polymerized for six more hours at 218° C. This low molecular weight basically modified copolyester (one part) was melt-blended with polyethylene terephthalate (5 parts) of high intrinsic viscosity at 275° C. for six minutes. A modified copolymer having an intrinsic viscosity of 0.73 and containing 0.16% nitrogen by analysis was obtained, which was melt-spun into fibers having high tenacity. These fibers dyed readily in aqueous boiling dyebaths containing metacresol with Pontacyl Rubine R (C. I. 179) and Pontamine Fast Red 8BL (C. I. 278) to good, deep, washfast shades.

More highly modified yarns obtained by this process containing 0.4–0.5% nitrogen were readily dyed with acid and direct colors to deep, washfast shades without the aid of a dye assistant.

*Example X*

An ethylene terephthalate copolymer prepared from ethylene glycol and 90% terephthalic acid and 10% sebacic acid was treated with N-benzyl diethanolamine in diphenyl ether for 6 minutes as described in Example I. The resulting copolymer was powder polymerized at 218° C. for 4 hours to give a copolyester with an intrinsic viscosity of 0.36 and containing 0.17% nitrogen by weight. Yarn prepared by melt spinning this treated copolymer dyed readily to deep shades in an aqueous dyebath containing du Pont Milling Red SWB (C. I. 430) and 2% metacresol as an assistant heated to 98° C. for one hour.

*Example XI*

Chip polyethylene terephthalate was treated with N-butyl diethanolamine for 45 minutes as described in Example II. The resulting polymer dyed readily to deep shades in an aqueous dyebath containing Anthraquinone Green GN (C. I.

1078) and 2% metacresol as an assistant heated to 98° C. for one hour.

*Example XII*

Chip polyethylene terephthalate was dissolved in a mixture of 10 parts of phenol and 7 parts of trichlorophenol containing N,N-di(hydroxyethyl) piperazine and heated at 130° C. for 10 minutes. The resulting polymer containing 0.15% nitrogen dyed readily to deep shades in an aqueous dyebath containing Pontacyl Light Yellow GG (C. I. 636) and 2% metacresol heated to 98° C. for one hour.

*Example XIII*

Chip polyethylene terephthalate was treated with di(β-hydroxyisopropyl)amine in diphenyl ether as described in Example I. The resulting polymer dyed readily to deep shades in an aqueous dyebath containing Pontamine Yellow CH (C. I. 365) and 2% metacresol heated to 98° C. for one hour.

*Example XIV*

Chip polyethylene terephthalate was treated with Ethomeen 18–15 (trade-mark of Armour and Company designating stearylamine N,N-bis-polyoxyethylene glycol of average molecular weight 496) for 30 minutes as described in Example II. The resulting polymer, after an acetone wash and drying, dyed readily to deep shades in an aqueous dyebath, containing acid dyestuffs and 2% metacresol as an assistant, heated to 98° C. for one hour.

*Example XV*

Polyethylene terephthalate yarn was dipped in dimethylaminoethanol and suspended for 30 minutes in an autoclave suspended in xylene refluxing at 140° C. After washing the treated yarn with acetone, the yarn was dried and found to be readily dyeable to deep shades with acid dyestuffs, using 2% metacresol as a dyeing assistant.

The process of this invention is particularly suited for use with the high molecular weight fiber-forming polyethylene terephthalates described, but copolymers prepared by substituting other dicarboxylic acids for part of the terephthalic acid or by using more than one glycol in the polymerization reaction may also be modified by this process.

Since the ester interchange reaction of this invention is generally accompanied by a decrease in the molecular weight of the ethylene terephthalate polymer as shown by intrinsic viscosity measurements, it is generally desirable to use a high intrinsic viscosity polymer. However, as shown in Example IX, low molecular weight polymers may also be modified and these modified polymers find utility as agents to be melt-blended with polyethylene terephthalate to impart dyeability with acid and direct dyestuffs.

The preferred basic modifiers of this invention are the N-alkyl substituted diethanolamines which correspond to the following formula:

wherein R represents alkyl, aralkyl or cycloalkyl. These materials, which lack the necessary stability at the high temperatures and periods of time required for the condensation polymerization in the formation of linear polyesters of fiber-forming molecular weights, are stable to color formation at the temperatures and times at which the ester interchange of this invention takes place. In addition, the ethylene terephthalate polymers modified with an aminoglycol can be repolymerized in powder form to higher molecular weight modified polymers if desired.

The copolymers resulting from the treatment of this invention contain various amounts of the modifying aminoalcohol depending upon the amount of modifier used and, to some extent, on the time and temperature of treatment. Aside from this fact, the amount of modifier used is not critical. Large excesses of the modifier will not damage shaped structures of ethylene terephthalate polymers as long as the time and temperature of treatment are controlled accordingly. As shown by the examples, the treating time may vary from as little as 2½ minutes to one hour and more, depending upon the temperature used and amount of modification desired.

The ester interchange process of this invention takes place at temperatures as low as 100° C. and increasing reaction rates are obtained at higher temperatures. Discoloration and degradation are also more rapid at the high temperatures such as 250°–275° C., and the treating time at such temperatures should be stopped before discoloration occurs. Shaped articles such as fibers, filaments, films, and the like, should be treated at temperatures below 200° C., preferably at 130°–150° C., and the length of treatment limited so that deformation and damage to the physical properties of the articles will not occur.

The modified ethylene terephthalate polymers of this invention are readily dyeable by commercial techniques with dyestuffs, which contain sulfonic acid groups and are applied normally from an acid dyebath. Such dyestuffs fall in the classes of acid and direct colors as known to the trade. Among these dyestuffs which have been used to dye the modified ethylene terephthalate polymers may be mentioned: Anthraquinone Blue SWF (Prototype of C. I. 12) Pontacyl Rubine R (C. I. 179), Du Pont Milling Red SWB (C. I. 430), Anthraquinone Green GN (C. I. 1078), Pontacyl Light Yellow GG (C. I. 636), Pontamine Yellow CH (C. I. 365), Pontamine Fast Red 8BL (C. I. 278), and Pontamine Fast Orange EGL (Prototype of C. I. 72).

The process of this invention affords a new and useful method of introducing basic aminoalcohol structures into polyesters, in particular, those aminoalcohols which, because of their instability, cannot be polymerized from the point of the original ester interchange of the monomer unit through the normal polymerization cycle. The resulting modified polyesters have not suffered the loss of their desirable characteristics and, in addition, can be readily dyed with acid and direct colors by standard commercial techniques.

Since many different embodiments of the invention may be made without departing from the spirit and scope thereof, it is to be understood that the invention is not limited by the specific illustrations except to the extent defined in the following claims.

What is claimed is:

1. A process for preparing modified polyethylene terephthalate containing dye receptive basic nitrogen which comprises treating an ethylene terephthalate polymer at temperatures in the range of 100° to 275° C. with an aminoalcohol represented by the formula

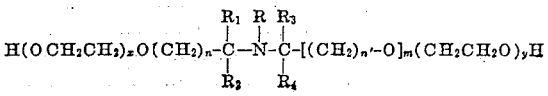

wherein R is selected from the group consisting of hydrogen and alkyl, aralkyl and alicyclic radicals of 1 to 18 carbon atoms; $R_1$, $R_2$, $R_3$ and $R_4$ are selected from the group consisting of hydrogen and hydrocarbon radicals of 1 to 6 carbon atoms, $R_1$ and $R_3$ being hydrocarbon radicals when R is hydrogen; $n$ and $n'$ are integers at least equal to 1; $m$ is 0 and 1; and $x$ and $y$ are integers at least equal to 0, continuing the treatment until the polymer has been made receptive to acid and direct dyes and stopping the treatment before discoloration of the polymer occurs.

2. A process for preparing modified polyethylene terephthalate containing dye receptive basic nitrogen which comprises treating a solution of an ethylene terephthalate polymer at temperatures in the range of 100° to 275° C. with an aminoalcohol represented by the formula,

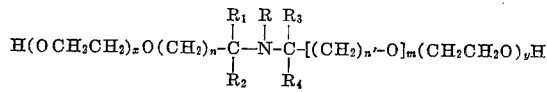

wherein R is selected from the group consisting of hydrogen and alkyl, aralkyl and alicyclic radicals of 1 to 18 carbon atoms; $R_1$, $R_2$, $R_3$ and $R_4$ are selected from the group consisting of hydrogen and hydrocarbon radicals of 1 to 6 carbon atoms, $R_1$ and $R_3$ being hydrocarbon radicals when R is hydrogen; $n$ and $n'$ are integers at least equal to 1; $m$ is 0 and 1; and $x$ and $y$ are integers at least equal to 0, continuing the treatment until the polymer has been made receptive to acid and direct dyes and stopping the treatment before discoloration of the polymer occurs.

3. A process for preparing modified polyethylene terephthalate containing dye receptive basic nitrogen which comprises treating an ethylene terephthalate polymer in solid form at temperatures in the range of 100° to 250° C. with an aminoalcohol represented by the formula

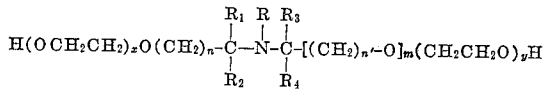

wherein R is selected from the group consisting of hydrogen and alkyl, aralkyl and alicyclic radicals of 1 to 18 carbon atoms; $R_1$, $R_2$, $R_3$ and $R_4$ are selected from the group consisting of hydrogen and hydrocarbon radicals of 1 to 6 carbon atoms, $R_1$ and $R_3$ being hydrocarbon radicals when R is hydrogen; $n$ and $n'$ are integers at least equal to 1; $m$ is 0 and 1; and $x$ and $y$ are integers at least equal to 0, continuing the treatment until the polymer has been made receptive to acid and direct dyes and stopping the treatment before discoloration of the polymer occurs.

4. A process for preparaing shaped polyester structures, such as fibers, films, and fabric, containing dye receptive basic nitrogen which comprises treating a shaped polyethylene terephthalate structure at temperatures in the range of 100° to 200° C. with an aminoalcohol represented by the formula,

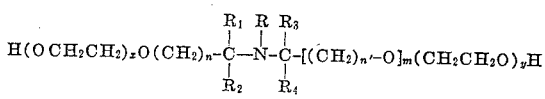

wherein R is selected from the group consisting of hydrogen and alkyl, aralkyl and alicyclic radicals of 1 to 18 carbon atoms; $R_1$, $R_2$, $R_3$ and $R_4$ are selected from the group consisting of hydrogen and hydrocarbon radicals of 1 to 6 carbon atoms, $R_1$ and $R_3$ being hydrocarbon radicals when R is hydrogen; $n$ and $n'$ are integers at least equal to 1; $m$ is 0 and 1; and $x$ and $y$ are integers at least equal to 0, continuing the treatment until the polymer has been made receptive to acid and direct dyes and stopping the treatment before discoloration of the polymer occurs.

5. A process for preparing modified polyethylene terephthalate containing dye receptive basic nitrogen which comprises treating an ethylene terephthalate polymer with methyldiethanolamine at temperatures in the range of 100° to 275° C., continuing the treatment until the polymer has been made receptive to acid and direct dyes and stopping the treatment before discoloration of the polymer occurs.

6. A process for preparing modified polyethylene terephthalate containing dye receptive basic nitrogen which comprises treating an ethylene terephthalate polymer with N-benzyl diethanolamine at temperatures in the range of 100° to 275° C., continuing the treatment until the polymer has been made receptive to acid and direct dyes and stopping the treatment before discoloration of the polymer occurs.

7. A process for preparing modified polyethylene terephthalate containing dye receptive basic nitrogen which comprises treating an ethylene terephthalate polymer with N-butyl diethanolamine at temperatures in the range of 100° to 275° C., continuing the treatment until the polymer has been made receptive to acid and direct dyes and stopping the treatment before discoloration of the polymer occurs.

8. A process for preparing modified polyethylene terephthalate containing dye receptive basic nitrogen which comprises treating an ethylene terephthalate polymer with di(β-hydroxyisopropyl) amine at temperatures in the range of 100° to 275° C., continuing the treatment until the polymer has been made receptive to acid and direct dyes and stopping the treatment before discoloration of the polymer occurs.

9. A modified ethylene terephthalate polymer containing in the polymer molecule a minor proportion of an aminoalcohol represented by the formula,

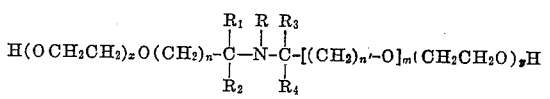

wherein R is selected from the group consisting of hydrogen and alkyl, aralkyl and alicyclic radicals of 1 to 18 carbon atoms; $R_1$, $R_2$, $R_3$ and $R_4$ are selected from the group consisting of hydrogen and hydrocarbon radicals of 1 to 6 carbon atoms, $R_1$ and $R_3$ being hydrocarbon radicals when R is hydrogen; $n$ and $n'$ are integers at least equal to 1; $m$ is 0 and 1; and $x$ and $y$ are integers at least equal to 0.

10. A shaped structure formed of an ethylene terephthalate polymer having chemically combined therewith a modifying amount of an aminoalcohol sufficient to make the structure readily dyeable with acid and direct dyes, said aminoalcohol being represented by the formula,

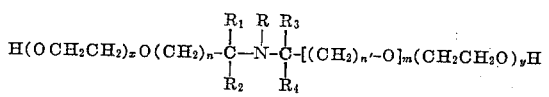

wherein R is selected from the group consisting of hydrogen and alkyl, aralkyl and alicyclic radicals of 1 to 18 carbon atoms; $R_1$, $R_2$, $R_3$ and $R_4$ are selected from the group consisting of hydrogen and hydrocarbon radicals of 1 to 6 carbon atoms, $R_1$ and $R_3$ being hydrocarbon radicals when R is hydrogen; $n$ and $n'$ are integers at least equal to 1; $m$ is 0 and 1; and $x$ and $y$ are integers at least equal to 0.

11. Yarn capable of being readily dyed with acid and direct dyes and formed of an ethylene terephthalate polymer chemically modified with an aminoalcohol represented by the formula,

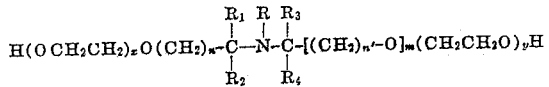

wherein R is selected from the group consisting of hydrogen and alkyl, aralkyl and alicyclic radicals of 1 to 18 carbon atoms; $R_1$, $R_2$, $R_3$ and $R_4$ are selected from the group consisting of hydrogen and hydrocarbon radicals of 1 to 6 carbon atoms, $R_1$ and $R_3$ being hydrocarbon radicals when R is hydrogen; $n$ and $n'$ are integers at least equal to 1; $m$ is 0 and 1; and $x$ and $y$ are integers at least equal to 0.

12. A modified ethylene terephthalate polymer containing in the polymer molecule a minor proportion of methyldiethanolamine.

13. A modified ethylene terephthalate polymer containing in the polymer molecule a minor proportion of N-benzyldiethanolamine.

14. A modified ethylene terephthalate polymer containing in the polymer molecule a minor proportion of N-butyldiethanolamine.

15. A modified ethylene terephthalate polymer containing in the polymer molecule a minor proportion of di($\beta$-hydroxyisopropyl)amine.

JOSEPH C. SHIVERS, Jr.

References Cited in the file of this patent

British Rayon and Silk Journal, Dec. 1949, page 45.